United States Patent
Lin et al.

(10) Patent No.: US 9,055,186 B2
(45) Date of Patent: Jun. 9, 2015

(54) SYSTEMS AND METHODS FOR INTEGRATING USER PERSONAS WITH CONTENT DURING VIDEO CONFERENCING

(71) Applicant: Personify, Inc., Chicago, IL (US)

(72) Inventors: Dennis Lin, Urbana, IL (US); David Scherba, Lincoln, NE (US); Mert Dikmen, Chicago, IL (US); Sumant Kowshik, Champaign, IL (US); Sanjay Patel, Urbana, IL (US)

(73) Assignee: PERSONIFY, INC, Chicago, IL (US)

( * ) Notice: Subject to any disclaimer, the term of this patent is extended or adjusted under 35 U.S.C. 154(b) by 115 days.

(21) Appl. No.: 13/948,539

(22) Filed: Jul. 23, 2013

(65) Prior Publication Data

US 2015/0029294 A1    Jan. 29, 2015

(51) Int. Cl.
*H04N 7/14* (2006.01)
*H04N 7/15* (2006.01)

(52) U.S. Cl.
CPC . *H04N 7/141* (2013.01); *H04N 7/15* (2013.01)

(58) Field of Classification Search
CPC ....... H04N 5/225; H04N 5/272; H04N 7/141; H04N 7/18; H04N 9/97; H04N 13/00; G06F 3/00; G06K 9/00; G06T 15/60; G06T 19/00
USPC ......... 345/419, 426, 633; 348/14.01, 43, 143, 348/207.1, 587; 375/360; 382/103, 154, 382/167, 203; 395/121; 434/250; 715/758
See application file for complete search history.

(56) References Cited

U.S. PATENT DOCUMENTS

| | | | |
|---|---|---|---|
| 5,563,988 A * | 10/1996 | Maes et al. | 345/421 |
| 5,812,214 A * | 9/1998 | Miller | 348/587 |
| 6,549,659 B1 * | 4/2003 | Welch et al. | 382/203 |
| 6,798,407 B1 * | 9/2004 | Benman | 345/419 |
| 7,003,061 B2 * | 2/2006 | Wilensky | 375/360 |
| 7,517,219 B2 * | 4/2009 | McDonald et al. | 434/250 |
| 8,094,928 B2 * | 1/2012 | Graepel et al. | 382/154 |
| 8,411,149 B2 * | 4/2013 | Maison et al. | 348/207.1 |
| 8,520,027 B2 * | 8/2013 | Itkowitz et al. | 345/633 |
| 8,649,592 B2 * | 2/2014 | Nguyen et al. | 382/154 |
| 8,659,658 B2 * | 2/2014 | Vassigh et al. | 348/143 |
| 8,712,896 B2 * | 4/2014 | Sheldon | 705/36 R |
| 8,818,028 B2 * | 8/2014 | Nguyen et al. | 382/103 |
| 2009/0244309 A1 | 10/2009 | Maison | |
| 2011/0193939 A1 | 8/2011 | Vassigh | |
| 2011/0242277 A1 * | 10/2011 | Do et al. | 348/43 |
| 2011/0249190 A1 | 10/2011 | Nguyen | |
| 2011/0267348 A1 * | 11/2011 | Lin et al. | 345/426 |
| 2011/0293179 A1 * | 12/2011 | Dikmen et al. | 382/167 |
| 2012/0011454 A1 * | 1/2012 | Droz et al. | 715/758 |
| 2014/0028794 A1 * | 1/2014 | Wu et al. | 348/43 |
| 2015/0029294 A1 * | 1/2015 | Lin et al. | 348/14.01 |

* cited by examiner

*Primary Examiner* — Gerald Gauthier
(74) *Attorney, Agent, or Firm* — Invention Mine LLC

(57) ABSTRACT

A system and method is disclosed for extracting a user persona from a video and embedding that persona into a background feed that may have other content, such as text, graphics, or additional video content. The extracted video and background feed are combined to create a composite video that comprises the display in a videoconference. Embodiments cause the user persona to be embedded at preset positions, or in preset formats, or both, depending on the configuration, position, or motion of the user's body.

20 Claims, 13 Drawing Sheets

SYSTEMS AND METHODS FOR INTEGRATING USER PERSONAS WITH CONTENT DURING VIDEO CONFERENCING

FIELD OF THE INVENTION

Embodiments of the present invention relate to the field of video processing, and more specifically towards systems and methods for integrating user personas with other display content during video conferencing.

BACKGROUND

Conventional video conferencing techniques typically employ a camera mounted at one location and directed at a user. The camera acquires an image of the user and background that is then rendered on the video display of another user. The rendered image typically depicts the user, miscellaneous objects, and background that are within the field-of-view of the acquiring camera. For example, the camera may be mounted on the top edge of a video display within a conference room with the user positioned to view the video display. The camera field-of-view may encompass the user and, in addition, a conference table, chairs, and artwork on the wall behind the user, i.e., anything else within the field-of-view. In this typical technique, the image of the entire field-of-view is transmitted to the video display of a second user. Thus, much of the video display of the second user is filled with irrelevant, distracting, unappealing, or otherwise undesired information. Such information may diminish the efficiency, efficacy, or simply the esthetic of the video conference. Additionally, typical video conferencing techniques do not incorporate the user with virtual content being presented. And the traditional capture of the user and surrounding environment would be unnatural when juxtaposed against virtual content within a composite video. Such a display would be a significant departure from the familiar experience of a face-to-face interaction with a presenter discussing content on a whiteboard or projected on a screen. Also, typical techniques require that the user manipulate content using the keyboard.

SUMMARY

The systems and methods disclosed herein disclose using depth, location, and configuration information relating to a foreground video to control or modify how the foreground video is combined with a background feed to create a composite video. Some embodiments comprise controlling the embedding of an extracted video persona into a background feed, which may be, e.g., a background video, a desktop, slides, images, or any application window.

In an embodiment, a foreground video is created from an extracted persona of a user from a first video. A background feed is received, as well as preset conditions and directions that correspond to the preset conditions and which direct the embedding of the foreground video. With this information, it is determined whether the foreground video exhibits a preset condition. Should the foreground video exhibit a preset condition, then the foreground video is embedded into the background feed based on the embedding directions that correspond to the preset condition.

In an embodiment, a preset condition relates to the distance the user moves from an initial position. Should the user remain within a first distance from the initial position, then the foreground video, when embedded, moves distances that are similar to the distances the user moves. Should the user move beyond the first distance, then the foreground video moves further than the user by a multiplying factor.

In an embodiment, a preset condition relates to the area in which a user moves. Should the user venture outside a threshold area, i.e., beyond a boundary, the foreground video is made transparent. In an embodiment, there is a border beyond the boundary and if the user is within that border, the foreground video is made partially transparent, where the degree of transparency is based on where the user is within the border. For example, the user is rendered more transparent the further the user moves from the threshold.

In an embodiment, the preset condition relates to the posture or other configuration of the user. For example, if the user is standing then the foreground video is embedded so that it is prominent within the composite video, perhaps in the center. But if the user is sitting, then the foreground video is embedded less conspicuously, perhaps in a lower corner, and perhaps only the head and shoulders are displayed.

DETAILED DESCRIPTION

In the following description, numerous details and alternatives are set forth for the purpose of explanation. However, one of ordinary skill in the art will realize that embodiments can be practiced without the use of these specific details. In other instances, well-known structures and devices are shown in block diagram form to avoid obscuring the embodiments with unnecessary detail.

Integrating the user persona with the presented content and reducing the need to rely on keyboard control of content can improve the effect of the video conference. Accordingly, it is highly desirable to have systems and methods for integrating user personas with content during video conferencing. The inventive systems and methods within may extract the persona of the user from the field-of-view of the acquiring camera and incorporate that user persona, or image, into content on the video display of the second user. Methods for extracting a persona from a video were published in application Ser. No. 13/076,264 (filed Mar. 20, 2011, by Minh N. Do, et al.) and Ser. No. 13/083,470 (filed Apr. 8, 2011, by Quang H. Nguyen, et al.), each of which is incorporated herein in its entirety by reference.

Figure 1:
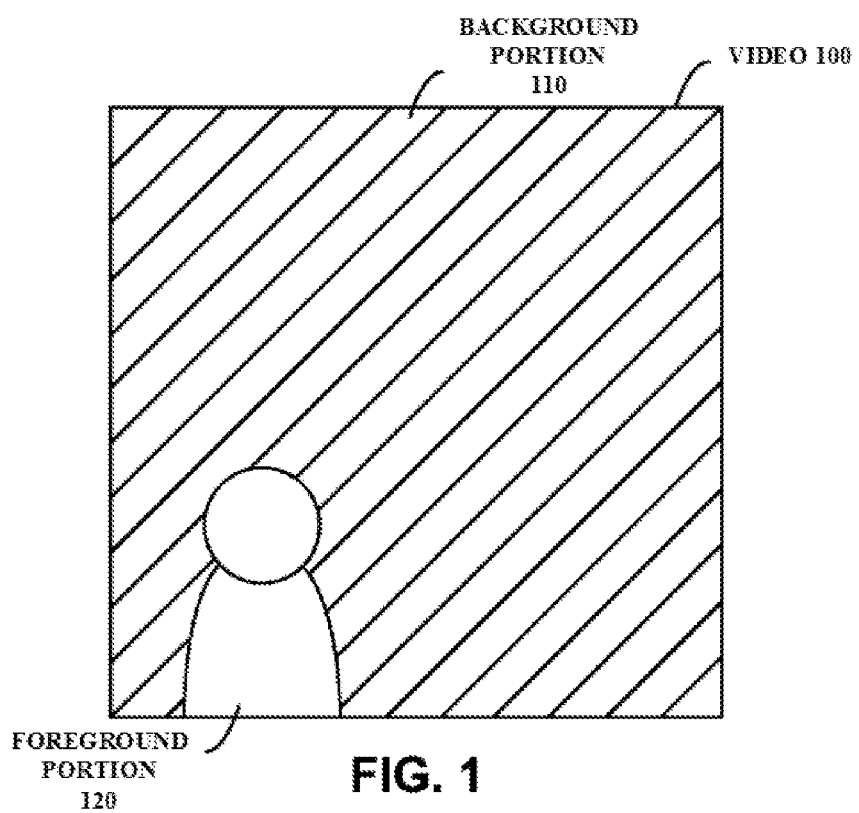
FIG. 1 illustrates an example video comprising a background portion and a foreground portion in accordance with some embodiments.

Extracting a user persona to create a foreground video will now be described regarding FIGS. 1, 2, and 3. FIG. 1 illustrates an example video 100. In general, the example video 100 comprises a background portion 110 and a foreground portion 120. For example, the background portion 110 may comprise a wall, outdoor scene, or any other background scene and the foreground portion 120 may comprise a human user or presenter. However, the foreground portion 120 may comprise any identifiable object or entity. Thus, the example video 100 may be divided into at least two portions—a background 110 and a foreground 120. For example, if the video 100 comprises a user speaking in a room, then the user may comprise the foreground portion 120 and a wall of the room may comprise the background portion 110.

Figure 2:
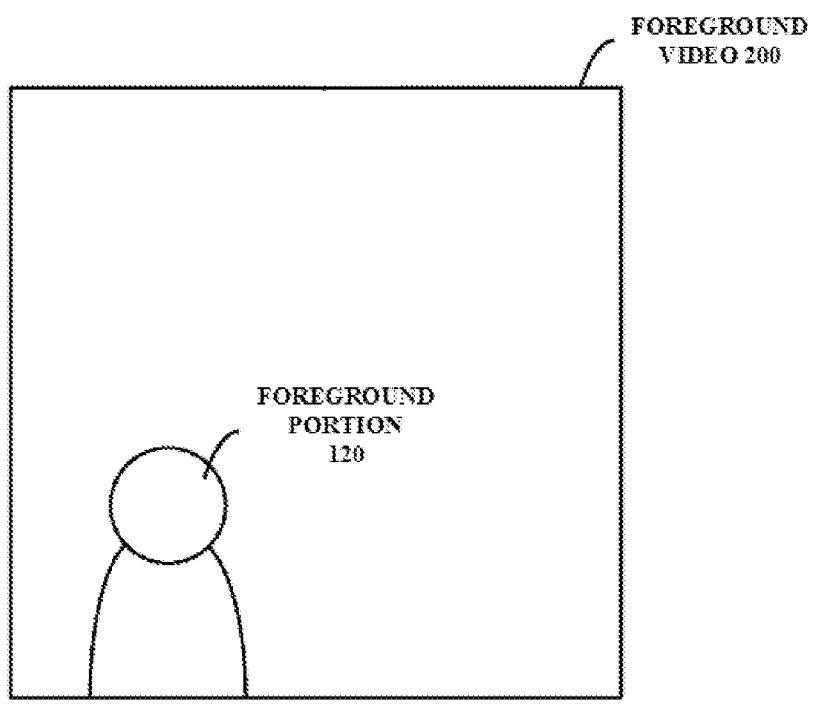
FIG. 2 illustrates an example video with the background portion subtracted or removed.

FIG. 2 illustrates an example foreground video 200. In general, the foreground video 200 comprises a foreground portion 120 of the video and the background portion 110 of the video has been subtracted or removed. In this regard, the foreground video approximates the video 100 with the removal or subtraction of the background portion 110.

Figure 3:
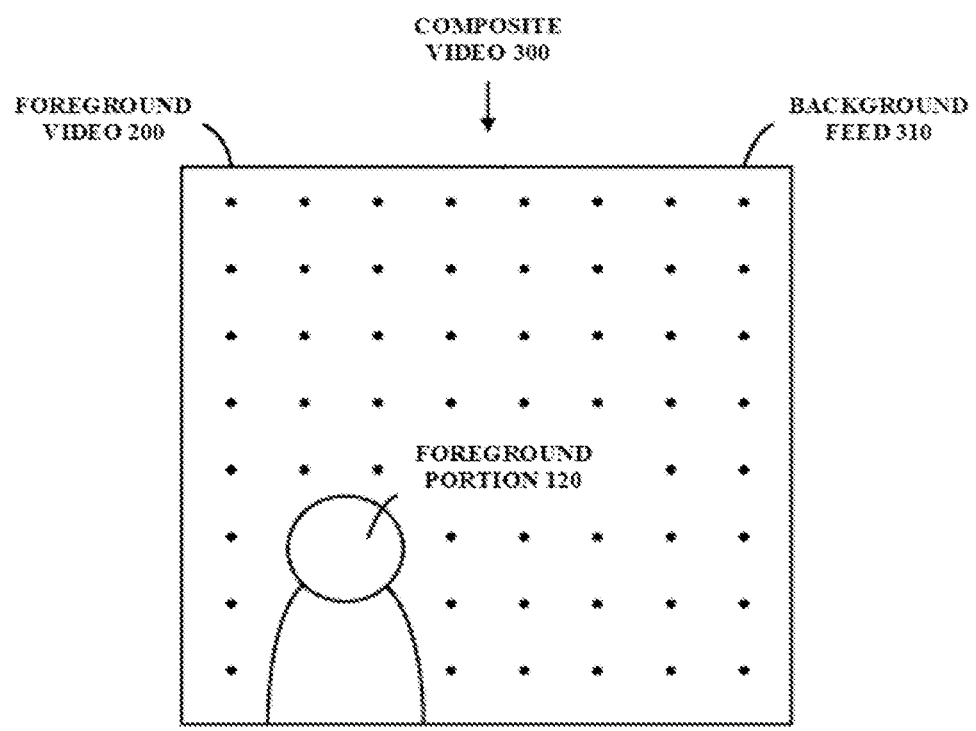
FIG. 3 illustrates an example composite video comprising a foreground video with a background feed in accordance with some embodiments.

FIG. 3 illustrates an example composite video 300. In general, the composite video 300 comprises the foreground video 200 embedded within a background. As seen in FIG. 3, the foreground video 200 is embedded within a background feed 310. For example, the foreground video 200 may comprise a user or presenter (i.e., the foreground portion 120) and the background feed 310 may comprise a presentation slide. In some embodiments, the background feed 310 may comprise any or all of an image, a presentation slide, web content, shared desktop, another video, prerecorded video stream, live video stream, and/or a 3D virtual scene. In some embodiments, a video of a presenter may be embedded into a presentation slide, shared desktop, or any other image or video.

Figure 4:
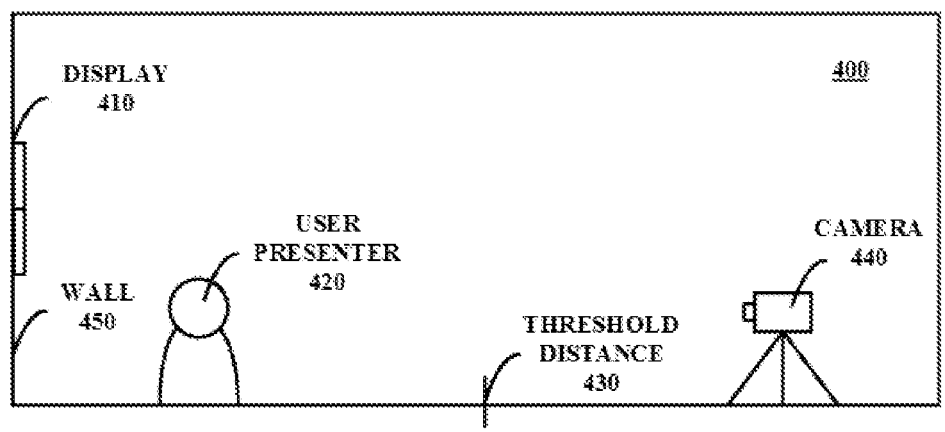
FIG. 4 illustrates an example setup comprising a threshold for displaying the foreground video with the background feed in accordance with some embodiments.

FIG. 4 illustrates an example setup 400 of a threshold for displaying the foreground video with the background feed in accordance with some embodiments. As seen in FIG. 4, a setup 400 may comprise a camera 440 capable of receiving depth information and color information (e.g., a 3D camera). The setup 400 may further comprise a user presenter 420 in front of a wall or background 450. In some embodiments, the camera 440 may receive a depth and color video of the user presenter 420 in front of the background 450. The setup 400 further depicts a threshold distance 430. The camera 440, or a connected computer system as discussed in further detail below, may subtract or remove the background 450 so as to create a foreground video. The foreground video may then be embedded into a background feed, and perhaps the background feed is shown on display 410. For example, the foreground video comprising the user presenter 420 may be embedded into a presentation slide.

Regarding embedding a foreground video comprising the image of a user presenter extracted from a video, in an embodiment a metric for quantifying the user' position is called the user's center of mass ("c.m."). In this embodiment, computing the center of mass of a user provides not the center of the user's actual mass, but the center of the image of the user's torso position. This facilitates mapping the movement of the user's torso to movement of the user's image within virtual content. It follows from the concept that human perception does not consider mere arm movements to indicate the overall movement of a person. A goal of this mapping is improving user image stability within the virtual content, which is enhanced by avoiding excessive jitter in the detected center of mass. And, since smoothness is a desired quality in an input device, enhanced image stability facilitates using the center of mass as an input to a user interface.

An embodiment of a method for computing the center of mass is based on the median of the pixel's x value (i.e., the horizontal offset in frame) for each pixel in the user image. The more obvious "mean" is projected to be less stable during standard body motions, i.e., employing the "mean" has may allow significant changes to result from stretching out the arm or hand gestures.

In an embodiment, the center of mass calculation can be optimized to improve stability by weighting pixels higher during the median computation if those pixels are located at the bottom of the image. The weighting criteria can vary in different embodiments. Weighting pixels that appear in a lower fraction of the image, such as the bottom third or bottom half (based on vertical offset of the user image in the frame, i.e., the pixel y-value) has been successful in practice. Stability improves because the bottom half of the body tends to be more stable during standing position, with upper body movements more common.

Figure 5:
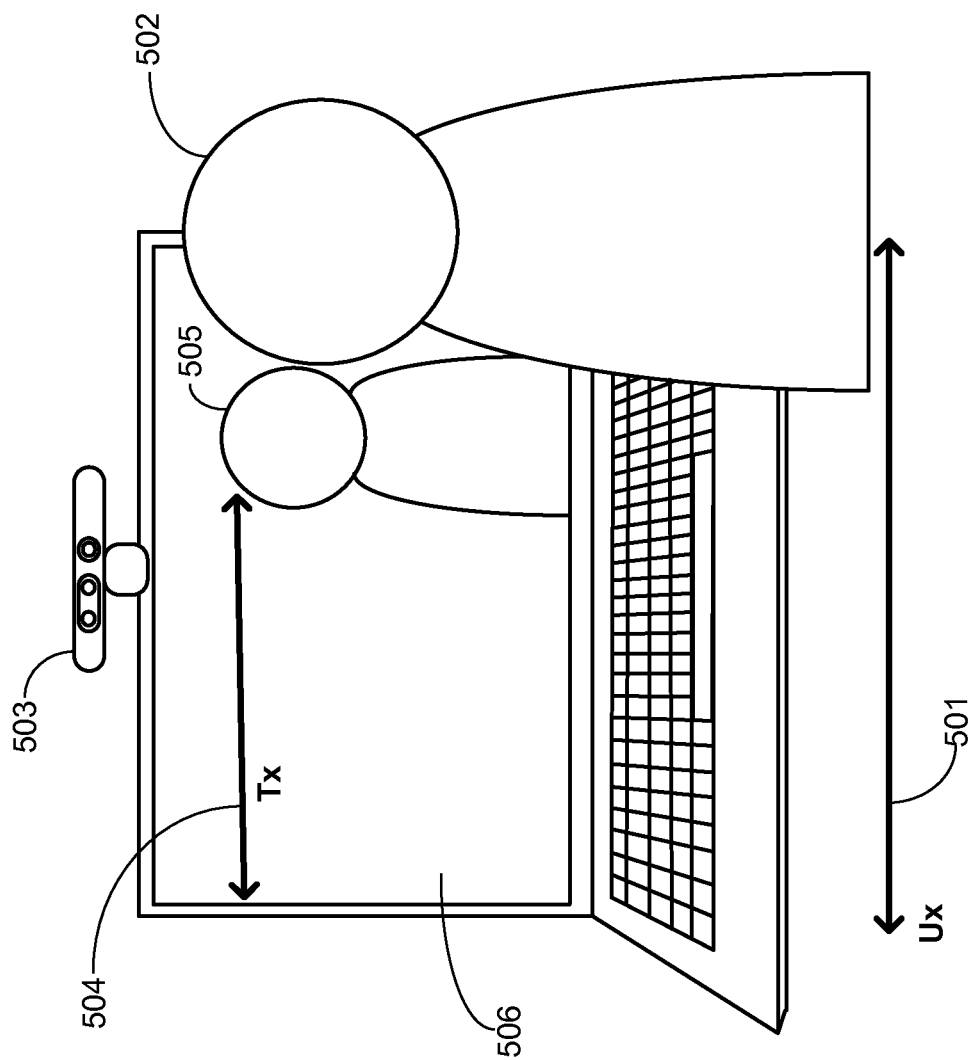
FIG. 5 illustrates concepts involved in mapping the physical movement of a user to virtual movement.

FIG. 5 illustrates concepts involved in mapping the physical movement of a user to virtual movement of the user image. In an embodiment, the physical movement Ux 501 of a user 502 within a field of view of a camera 503 is mapped to a virtual movement Tx 504 of the user image 505 across virtual content on a display 506. The physical offset Ux 501 of the user 502 in the field of view may be measured in pixels or distance. Virtual content often has a different aspect ratio (usually wider) than the field of view of a camera and an embodiment provides a method for adjusting for this difference.

Figure 6:
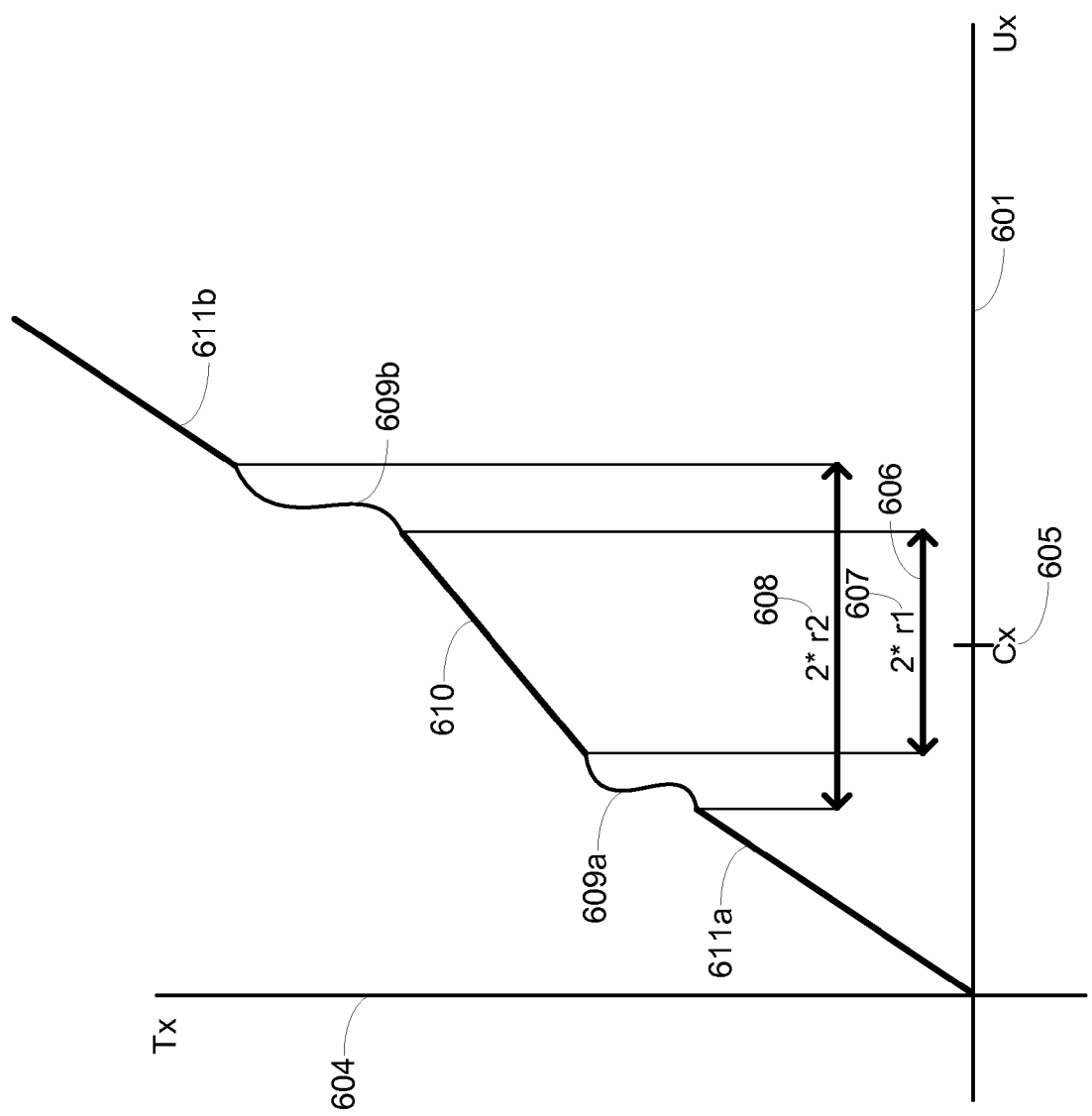
FIG. 6. is a graph illustrating an embodiment of a relationship for mapping the physical movement of a user to virtual movement across a display.

FIG. 6. is a graph illustrating an example of an embodiment of a relationship for mapping the physical movement of a user to movement of the user's image within virtual content. The embodiment results in a "sliding window" for adjusting the movement of a user that addresses the difference between the aspect ratios of a physical camera and virtual content. In FIG. 6, Ux 601 is the horizontal offset of the user within the physical field of view of the camera and Tx 604 is the offset of the user in virtual content. Cx 605 is the horizontal mid-point of a "dead zone," 606 an interval on the horizontal axis where a change in the user's physical horizontal offset is mapped to an equal change in the user's virtual offset ($\Delta Tx = \Delta Ux$, i.e, there is a linear relationship 610 with slope=1 between Ux and Tx). The dead zone 606 extends for a length of r1 607 on either side of Cx 605, so the total distance is 2*r1. The dead zone 606 should be made as small as possible while still accommodating small shifts of the user position. Should dead zone 606 be made too large the on-screen image may appear to jerk as the user transitions out of the dead zone. The relationship between Tx 604 and Ux 601 is linear within the dead zone 606 so that small changes in user position do not result in large jumps on-screen. For movements greater than distance r1 607 from Cx 605, a smooth curve 609$a,b$ controls the relationship between Ux 601 and Tx 604. The smooth curve 609$a,b$ connects the dead zone linear relationship 610 ($\Delta Tx=\Delta Ux$) with a second relationship 611$a,b$, which controls for Ux 601 from r1 607 up to a distance r2 608 from Cx 605. The smooth curve 609$a, b$ could be a cubic spline, or any other smooth curve that avoids jerking the user image, preserving the smoothness of the horizontal motion of the user. At the distance r2 608 from Cx 605 the second relationship 611$a,b$ becomes controlling. This second relationship 611$a,b$ maps a user's movement in a physical field of view, Ux 601, to a user's movement in virtual content, Tx 604, which results in a user's movement within the physical field of view causing a greater movement of the user's image within the virtual content. In an embodiment, this second relationship 611$a, b$ is linear, i.e., $Tx=k*Ux+m$, where k and m may be adjusted in light of the difference between the camera's and the virtual content's aspect ratios. Note that the choice of a particular smooth curve may also effectively reduce or expand the ranges that are governed by the first and second relationships. Also understand that a single equation may be crafted to control the relationship between Ux and Tx. The single equation would preferably result in changes of Ux near Cx causing similar changes in Tx (i.e., a situation similar to movements within r1 607 of Cx 605 as previously described), and would result in changes of Ux where the user has departed substantially from Cx causing progressively greater changes of Tx (i.e., a situation similar to movements outside of r2 608 of Cx 605 as previously described). The progressive nature of the change may generally be accomplished by other-than-first order functions, such as quadratic, or higher-order functions, or exponential functions. Note that the distances r1 and r2 may be adjusted to improve the perception of user movement within the virtual content, and that such improved perception may include a smoother transition between movement governed by the first and second relationships. Also note that a similar technique may be employed to map vertical physical user movements to vertical virtual user movements. Indeed, the axis along which r1 and r2 are measured can be rotated about the user image and a new user position, Cx', calculated relative to the new axis orientation (x'), with the mapping of Ux' to Tx' accomplished according to the embodiment discussed with reference to FIGS. 5 and 6, above, but now with respect to user movement along the new axis x'. Thus, per an embodiment, r1 and r2 are radii representing user movements in a direction about a central point and an embodiment maps user movement Ur to user image movement Tr in the direction represented by vectors r1 and r2, according to the principles disclosed with reference to FIGS. 5 and 6, but where distances r1 and r2 have been changed to vectors r1 and r2. Note that the position of Cx or Cx' could be determined using the embodiment that provides a center of mass as discussed earlier, but that a Cx or Cx' may be obtained using other known techniques for determining the position of the user.

Figure 7:
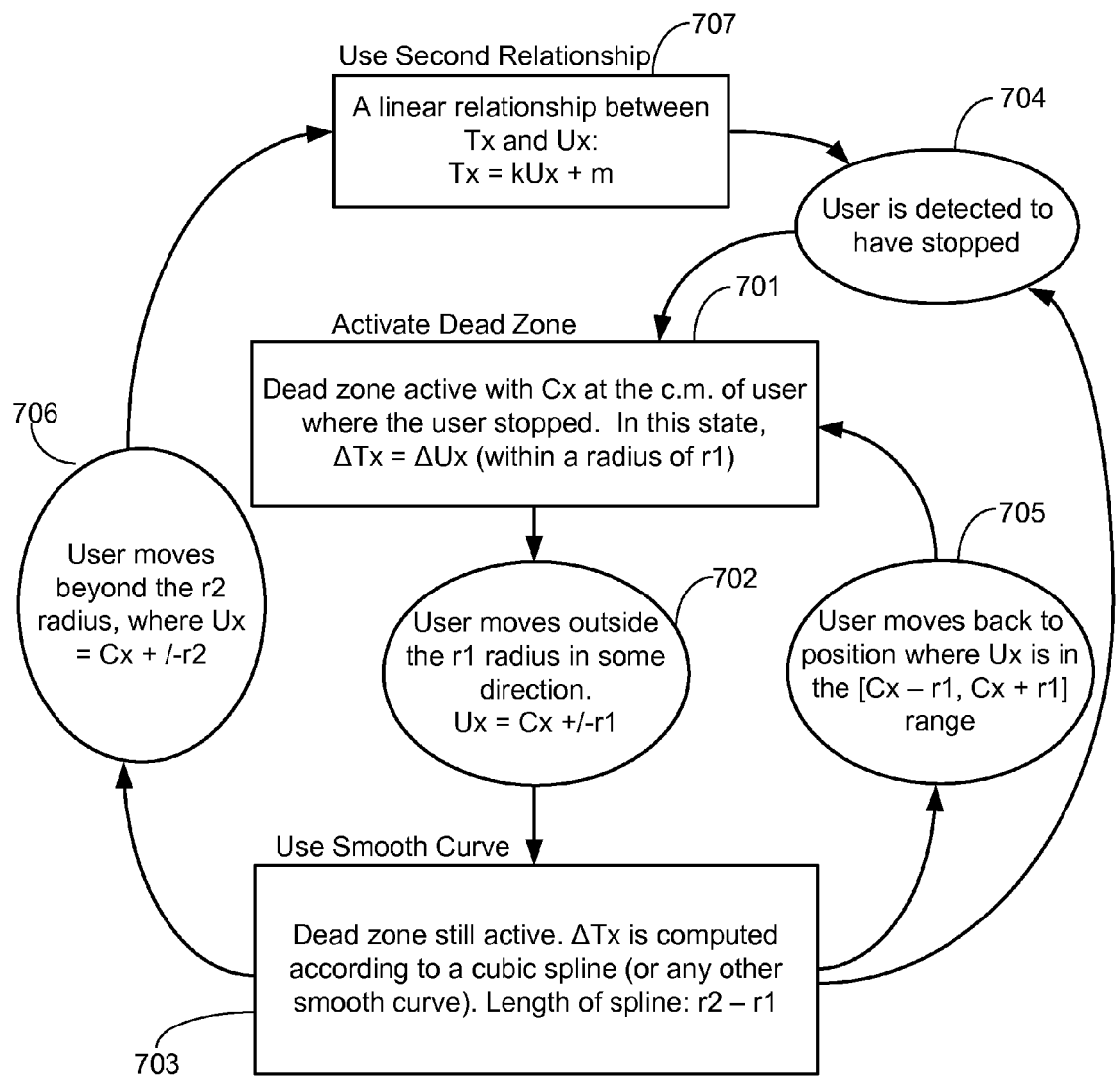
FIG. 7 is a flow diagram illustrating an embodiment of a method for mapping the physical movement of a user to virtual movement across a display.

FIG. 7 is a flow diagram illustrating an embodiment of a method for mapping the physical movement of a user to virtual movement of the user image across a display and initially described while referencing FIG. 6. Given a user stopped at an initial location Cx, Activate Dead Zone 701 activates a dead zone about a stopped user where the offset of the user image within virtual content is equal to the offset of the user in the physical field of view of the camera (i.e, a first linear relationship: $\Delta Tx=\Delta Ux$) for user movement within a distance r1 from initial location Cx. If the user Moves Outside r1 702, Use Smooth Curve 703 causes $\Delta Tx$ to be computed according to a smooth curve (such as a cubic spline) as discussed with reference to FIG. 6. After a user Moves Outside r1 702 there are three possible alternatives: the user is Detected To Have Stopped 704, the user Moves Back Within r1 705 (from the original point Cx), or the user Moves Beyond r2 706 (from the original point Cx). If the user is Detected To Have Stopped 704, then Activate Dead Zone 701 establishes a new initial location Cx'. If the user Moves Back Within r1 705, then Activate Dead Zone 701 retains the original dead zone Cx and maps changes in the offset of the user in the physical field of view of the camera to equal changes in the offset of the user image within virtual content (i.e, first linear relationship $\Delta Tx=\Delta Ux$). If the user Moves Beyond r2 706, Use Second Relationship 707 causes virtual changes $\Delta Tx$ to be computed according to a second relationship that results in a user's movement within the physical field of view $\Delta Ux$ causing a greater movement of the user's image within the virtual content $\Delta Tx$. In an embodiment, this second relationship is linear with a slope (k) and constant (m) (i.e., $Tx=k*Ux+m$). Continuing from Use Second Relationship 707, which controls after a user Moves Beyond r2 706, there are three possible alternatives, each of which has been previously described: the user is Detected To Have Stopped 704, the user Moves Back Within r1 705, and the user Moves Outside r1 702 (which in this case also means that the user is between r1 and r2 from Cx). Although Use Second Relationship 707 is described as employing a linear relationship, other relationships such as quadratic and exponential could be employed advantageously as described with respect to FIG. 6. In an embodiment, Ux ranges from 0 to 640 and k and m are chosen such that Tx ranges from −64 to 917. This effectively converts a camera with a 4:3 field of view to a 16:9 wide angle display. The negative number is employed to compensate for difficulties in calculating the c.m. near the edges of the field-of-view.

There exist additional factors to be considered in optimizing an embodiment. Regarding Detected To Have Stopped 704, this may be determined by detecting no change in the position of the user center of mass for an arbitrary number of frames. In an embodiment, a counter is incremented by one (1) for each frame that the user center of mass moves and decreased by ten (10) for each frame that the user center of mass does not move (with a starting point of 150). Thus, if the user spends 1 s moving (30 frames), then whether the user has stopped is decided in 0.1 s (3 frames). The initial 150 count guarantees an initial wait of at least 0.5 s (15 frames). This can be generalized.

Another consideration is how to adjust for dead zone lateral movement, e.g., a slow drift of the user to one side. In an embodiment, small shifts in user position within the dead zone cause Cx to shift over a number of frames to the new position of the user (as measured by, for example, a new center of mass). Thus, small shifts of Cx are adjusted for even when the user does not move beyond r1 or r2. The purpose of shifting Cx in the absence of movements beyond r1 and r2 is to retain image stability. Since, within the dead zone, changes in user movement are typically mapped to equal changes in the user image within virtual content, the mapping within the dead zone is probably the least jerky and most stable. Maintaining the user in the center of the dead zone potentially reduces the number of user movements that extend beyond r1 or r2 and, because they extend beyond r1 and r2, result in more exaggerated and potentially jerky movements of the user image within the virtual content.

In an additional consideration, the width of the dead zone about Cx (i.e., +/−r1) and the associated distance r2 may be made dependent on the distance of the user from the camera (the z-value). In an embodiment, the dependence is set to make the dead zone width (r1) to reduce linearly with depth (z-value). Thus, when the user is farther away from the camera, the dead zone is reduced, and when the user is nearer the camera the dead zone is increased. The rationale for this relationship is that small physical movements can cause bigger changes in user center of mass when the user is closer to the camera. This reduces the need to increase the user movement pursuant to Use Smooth Curve 703 (FIG. 7) or Use Second Relationship 707 (FIG. 7) when mapping to image movement within virtual content.

Figure 8:
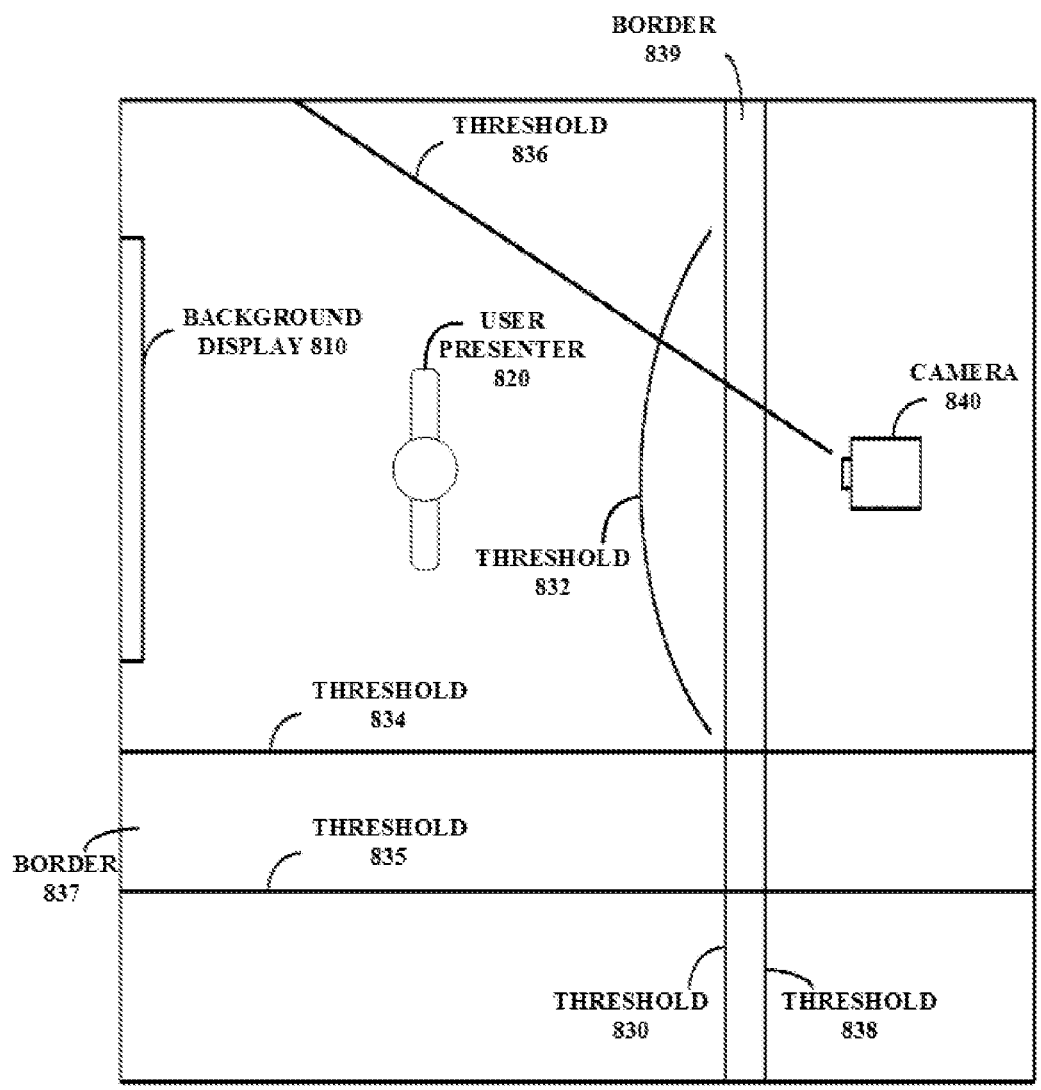
FIG. 8 is an illustration of a top-view of an example setup comprising thresholds for displaying the foreground video with the background feed in accordance with some embodiments.

Now regarding FIG. 8, which illustrates a top-view of an example setup comprising thresholds for displaying the foreground video with the background feed in accordance with some embodiments, at least one of which provides the ability to fade the foreground video in and out based on the position of the subject of the foreground video. In FIG. 8, the foreground video of the user presenter 820 may be embedded into the background feed, which is perhaps being shown on display 810, based on a control input. For example, the foreground video may be embedded into the background feed based upon a gesture from the user presenter 820, a mouse click, a remote control input, an input into a smartphone application, or a keyboard stroke. In some embodiments, the foreground video may be embedded into the background feed based upon a user presenter threshold 830. For example, the user presenter threshold 830 may comprise a predefined distance from the camera 840, as measured along a line parallel to the center of the camera's field-of-view, such that if the user presenter 820 meets or exceeds the threshold limit, then the foreground video comprising the user presenter 820 may be embedded into the background feed. For example, user presenter threshold 830 may comprise a distance of 2 feet from the camera 840. Thus, if user presenter 820 is at or beyond 2 feet from camera 840, then the foreground video comprising the user presenter 820 may be embedded into the background feed 810. However, if the user presenter 820 is 1 foot away from the camera 840, then the user presenter 820 is under the user presenter threshold 830 and the foreground video will not be embedded into the background feed. Given this scenario, the user presenter 820 as shown in FIG. 8, being beyond threshold 830, would be embedded in the background display 810.

Pursuant to an embodiment, the camera 840 may receive a depth image comprising the user presenter 820. The camera 840 and/or related hardware or software may continuously monitor the depth image comprising the user presenter 820. If the user presenter 820 meets a defined threshold (e.g., a distance from the camera 840), then the systems and methods disclosed herein may embed a video of the user presenter 820 (e.g., the foreground video) into the background feed 810 (e.g., a presentation slide). However, if the user presenter 820 does not meet the defined threshold, then the systems and methods disclosed herein may not embed a video of the user presenter 820 into the background feed 810. Moreover, since the camera 840 may continuously monitor or receive the depth images, the foreground video may be repeatedly embedded or removed from the background feed 810 depending on the movement of the user presenter 810. Restated, the systems and methods disclosed herein may detect a user presenter moving forward or backwards and use such user movement to embed a foreground video comprising the user presenter into a second video, image, presentation slide, or any other image or video. And depth information may be obtained from a variety of cameras, e.g., infrared cameras, structured light and time-of-flight cameras, and stereo cameras.

User presenter threshold 830 need not be a straight line. Should it be desired, the same depth information that provides for a straight user presenter threshold 830 could provide for a curved user presenter threshold 832, which may be a radius distance from the camera 840 or other chosen point. In addition, thresholds 830 and 832 need not be limited to defining a distance that user presenter 820 must meet or exceed to be embedded. In an alternative, thresholds 830 and 832 may define a distance that user presenter 820 must be at or within that distance from camera 840 to become embedded, i.e, with this scenario, the user presenter 820 as shown in FIG. 8 being beyond threshold 830 would not be embedded in the background display 810.

Although the above example discusses using depth image of the user presenter 820 to embed or not embed the user presenter 820 into the background feed, the camera 840 may also detect the user presenter 820 moving from side to side (i.e., not changing in depth relative to the camera 840) to control whether or not to embed the foreground video into the background feed 810. For example, the user presenter 820 moving to the right may indicate that the foreground video should be embedded into the background feed and the user presenter 820 moving to the left may indicate that the foreground video should not be embedded into the background feed.

Regarding side-to-side movement, FIG. 8 illustrates an embodiment that employs a side threshold 834 that functions much as user presenter threshold 830 did. In some embodiments, the foreground video may be embedded into the background feed based upon a user presenter lateral threshold 834. For example, the user presenter lateral threshold 834 may comprise a predefined lateral movement relative to camera 840 such that if the user presenter 820 is at or within lateral threshold 834, then the foreground video comprising the user presenter 820 may be embedded into the background feed. For example, the user presenter threshold 834 may comprise a distance of 5 feet from the camera 840, measured laterally from a line along the center of the camera's field-of-view (not shown). Thus, if the user presenter 820 is at or within the 5 feet user presenter lateral threshold 834, then the foreground video comprising the user presenter 820 may be embedded into the background feed 810. However, if the user presenter 820 is 16 feet away from the camera 840, then the user presenter 820 is beyond the user presenter lateral threshold 834, and the foreground video will not be embedded into the background feed. Thus, in this embodiment, the user presenter 820 as shown in FIG. 8, being within lateral threshold 834, would be embedded in the background display 810.

User presenter lateral threshold 834 need not be a line parallel to the center of the camera's field-of-view. Should it be desired, the same depth information that provides for a user presenter lateral threshold 834 could provide for an angled user presenter lateral threshold 836, which may be a straight line offset an arbitrary angle from the center of the camera's field-of-view as shown in FIG. 8. In addition, threshold 834 and 836 need not be limited to defining a distance that user presenter 820 must be at or within to be embedded. Thresholds 834 and 836 may alternatively define a distance that user presenter 820 must be beyond the center of the field-of-view of camera 840 to become embedded, i.e, in this embodiment, the user presenter 820 as shown in FIG. 8 being within threshold 834 would not be embedded in the background display 810.

Still regarding the selective embedding of a foreground video of a user presenter 820, in an embodiment the foreground video of user presenter 820 is rendered partially or completely transparent before being embedded in the background display 810. Thus, using standard transparency features provided by known video rendering software, the foreground video can be rendered transparent before being embedded in the background display 810, and with depth and lateral distance information the degree of transparency may be determined by where the user presenter 820 is located. This embodiment provides the ability to fade the foreground video of user presenter 820 in and out of background display 810 based on position. So, continuing with this embodiment, borders are defined relative to camera 840, such as depth border 839 between user presenter threshold 830 and second user presenter threshold 838, or lateral border 837 between lateral threshold 834 and second lateral threshold 835, or both. Also, for each border 837, 839, a fade profile is chosen. In an embodiment, the fade profile may be a linear increase in transparency such that the foreground video is at 0% transparency with user presenter 820 at the threshold and increases linearly to 100% with user presenter 820 at the other side of the threshold. For example, with FIG. 8 and depth border 839, as the user presenter 820 approaches and attains threshold 830 the foreground video is incorporated fully within background display 810, with 0% transparency. Once it is determined that user presenter 820 has crossed over threshold 830 and into border 839, then the foreground video is rendered increasingly transparent as user presenter 820 travels increasingly further into border 839. Upon user presenter 820 reaching second threshold 838, the foreground video image of user presenter 820 will be rendered 100% transparent. The fade profile may also be other than linear, and could encompass stepped or discontinuous profiles, or curved profiles that increasingly (or decreasingly) fade the foreground video as user presenter 820 passes through the border, and that fade profiles need not result in 100% transparency of the foreground video. Borders, similar to borders 839 and 837, could be associated with angular lateral threshold 836 or curved user threshold 832. Regarding a border associated with angular lateral threshold 836, such a border may be defined angularly itself and incorporated to account for the known decreasing performance of a camera 840 as the user presenter 820, moving laterally, approaches an edge of optimum performance, such as an edge defined by the camera's field-of-view. Similarly, regarding a border associated with user presenter threshold 830, such a border may be defined by a radius and incorporated to account for the known decreasing performance of a camera 840 as the user presenter 820, moving forward, approaches an edge of optimum performance, such as an edge defined by the camera's focal distance. In an embodiment, a border is defined to account for the minimum or maximum range of the apparatus providing depth information. Borders could also be defined that partially or completely surround user presenter 820. An advantage of being able to fade the foreground video is that a user presenter 820 may move to within inches of camera 840 (perhaps to make a keystroke on a PC), without causing a close-up of user presenter 820 to become embedded into background display 810.

Figure 9:
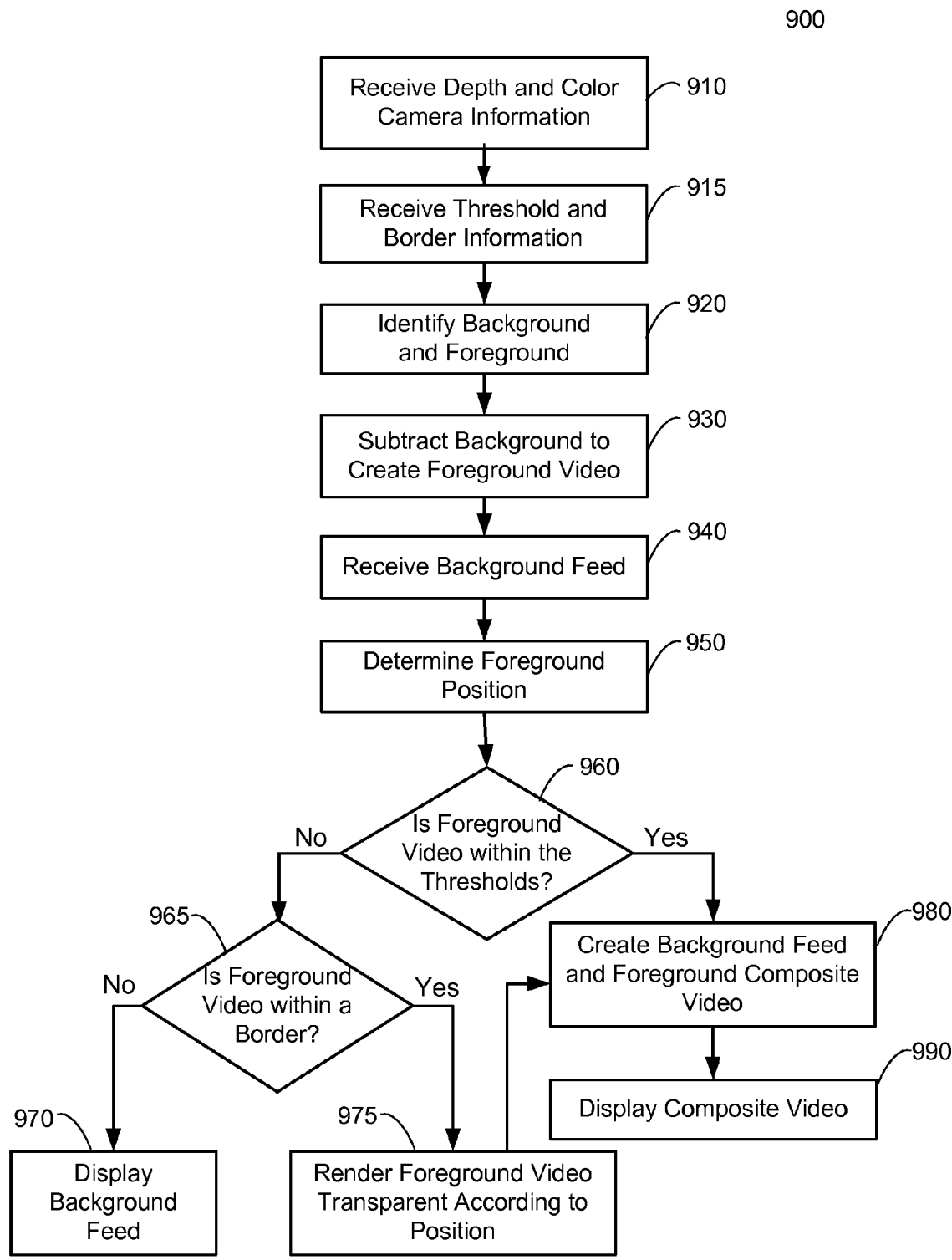
FIG. 9 is a is a flow diagram illustrating an example embodiment of a method for embedding a foreground video in a background feed depending on user position.

As seen in FIG. 9, which is a flow diagram illustrating an example embodiment of a method for embedding a foreground video, at block 910, depth and color camera information of a video is received. In some embodiments, the depth information may relate to the distance to points in an image scene from a specific point. For example, the depth information may comprise the distance of each pixel of an image frame of a video from a sensor. The color information may comprise color pixel information of an image frame of a video. The depth and color camera information may be received from a three dimensional (3D) camera, depth camera, z-camera, range camera, or from a plurality of sources. For example, the color information may be received from a color camera and the depth information may be received from a depth camera. In some embodiments, the color information and depth information may be received from a single camera. For example, the color information may be received from an red-blue-green (RGB) sensor on a camera and the depth information may be received from an infrared (IR) sensor comprised within the same camera. Generally, the method 900 receives depth and color information of a video.

At block 915, threshold and border information is received. In some embodiments the threshold and border information may define a square stage where the foreground video, created from a user presenter located within the stage, is not rendered transparent (i.e., remains opaque as normal). In these embodiments the threshold and border information define a border about the stage where the foreground video, created from a user presenter located within the border, is rendered partially or completely transparent, and the degree of transparency determined by the position of the user presenter within the border and fade profile information, which is also received with threshold and border information. As discussed, the fade profile could call for the foreground video to be rendered transparent with the degree of transparency increasing linearly with the position of the user presenter within the border. But, the fade profile could also be a higher-order curved function, step-function, or other arbitrary user choice. In addition, the size, shape, and location of the thresholds and borders could be based on factors ranging from the performance characteristics of the camera (e.g. field-of-view, optimum focal distances) to the limits of the user's imagination.

At block 920, the background portion and the foreground portion of the video are identified. For example, given an example of a human presenter in front of a wall, the foreground portion may comprise the human presenter and the background portion may comprise the wall. Thus, at block 920, the depth information and/or color information is used to identify the background portion and the foreground portion of a video. At block 930, the background portion of the video is subtracted or removed to create a foreground video. For example, in the previous example of a human presenter in front of a wall, the image of the wall may be removed and the resulting video may only comprise the foreground portion (e.g., the human presenter).

At block 940, a background feed is received. In some embodiments, the background feed may comprise an image or a slide from a presentation or a series of images or slides from a presentation. For example, the background feed may comprise a series of presentation slides for which a human presenter will discuss. In the same or alternative embodiments, the background feed may comprise an image or view of a shared computer desktop, a pre-recorded video stream, live recording video stream, and/or a 3D virtual scene. Generally, the background feed may comprise any image, video, or combination of at least one image or at least one video.

At block 950, the position of the foreground video is determined. With the foreground video from block 930 and the depth and color information from block 910 the location of the foreground video relative to the camera is determined. In an embodiment, the center of mass (c.m.) of the foreground video may be computed as discussed earlier.

At block 960, it is determined whether the foreground video is within all thresholds, that is, it is determined whether the foreground video is to be rendered without any transparency. The foreground video position from block 950 is compared to the threshold information received during block 915. If the foreground video is not within all thresholds, then in block 965, it is determined whether the foreground video is within a border, comparing foreground video position information from block 950 and border information from block 915. If the foreground video is also not within a border, then in block 970 the background feed is displayed without embedding the foreground video. Returning to block 960, if the comparison determines that the foreground video is within all thresholds, then in block 980 the foreground video is embedded into the background feed to create a composite video. Subsequently, in block 990, that composite video is displayed. Returning now to block 965, if the comparison determines that the foreground video is within a border, then in block 975 the foreground video is rendered transparent according to the foreground video position from block 950 and the fade profile from block 915. Subsequently, the modified foreground video is embedded into the background feed in block 980 and the composite video displayed in block 990.

In an embodiment, between 960 and 980, or between blocks 975 and 980, or between both sets, an additional block (not shown) may be inserted that requires an additional control input to be received before the foreground video is embedded into the background feed. The control input may comprise an action to embed the foreground video into the background feed. If it is determined that the foreground video should not be embedded, then the foreground video is not embedded into the background feed. Thus, in some embodiments, the background feed may be displayed without the embedding or insertion of the previously identified foreground video, as is the case in block 970, but where the foreground video is otherwise within the thresholds or a border. In some embodiments the control input may provide instruction as to where to embed the foreground video within the background feed.

Figure 10A:
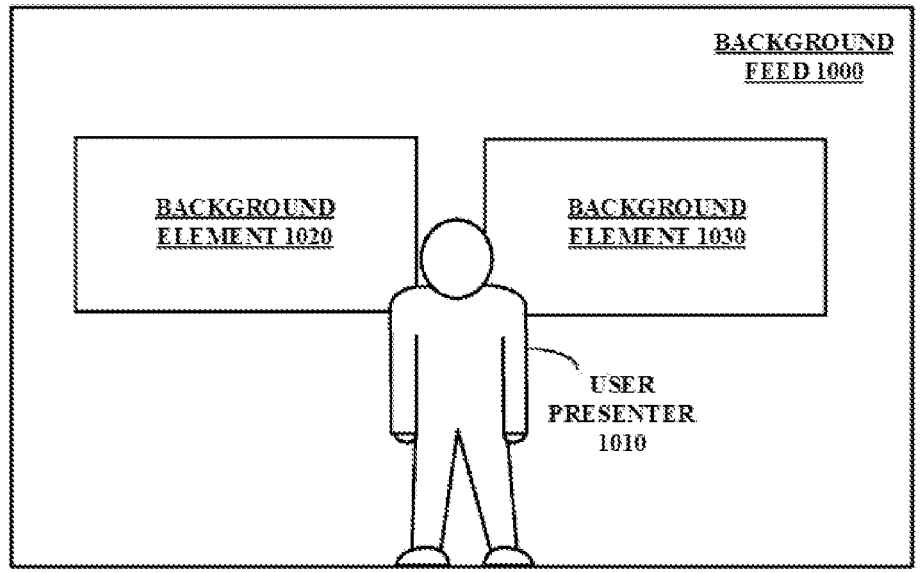
FIG. 10a illustrates an embodiment of a method for embedding a foreground video into a background feed depending on user configuration.
Figure 10B:
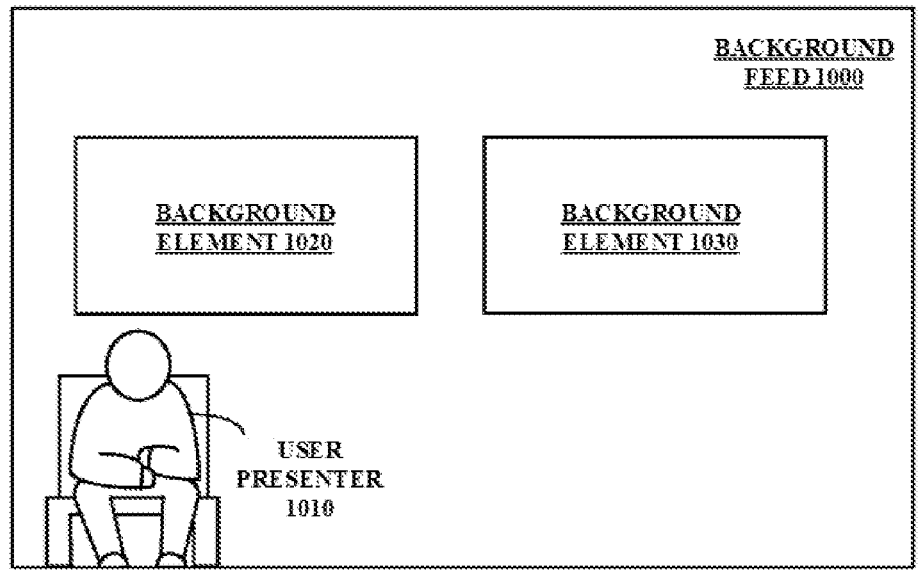
FIG. 10b illustrates an embodiment of a method for embedding a foreground video into a background feed depending on user configuration.

Now regarding FIGS. 10*a* and 10*b*, which illustrate an embodiment of a method for embedding a foreground video into a background feed. In this embodiment, the foreground video comprising user presenter 1010 is embedded into background feed 1000 and the location and other aspects of the embedding, such as size and coloring, may be controlled by the posture or shape assumed by the user presenter. This is advantageous because it provides the ability to change the rendering of user presenter 1010 simply by sitting or standing, which may improve the overall effect of the video by not requiring user presenter 1010 manipulate controls that might detract from any message user presenter 1010 is attempting to convey. As illustrated by FIG. 10*a*, user presenter 1010 is embedded within background feed 1000, which contains background elements 1020, 1030. User presenter 1010 is standing and is embedded near the center of background feed 1000. User presenter 1010 is also rendered opaque so as to appear to be in front of background elements 1020, 1030.

However, in this embodiment as depicted in FIG. 10*b*, when user presenter 1010 assumes a seated position, user presenter 1010 is embedded within background feed 1000 differently. The assumption of a seated position causes user presenter 1010 to be embedded in a less prominent location within background feed 1000, which is depicted as a corner of background feed 1000. In FIG. 10*b*, user presenter 1010 is embedded in the left corner of background feed 1000, and is also rendered as being seated and approximately the same scale as in FIG. 10*a*. However, in an embodiment, upon assuming a seated position, user presenter 1010 could also be rendered differently, such as: significantly smaller, only from the shoulders up, in a different corner, in black and white, or partially transparent, etc. In these embodiments, the ability to render user presenter 1010 in a less prominent manner focuses a viewer's attention on background elements 1020, 1030, which as depicted in FIG. 10*b* are no longer obscured by user presenter 1010. In addition, the rendering of user presenter 1010 in FIG. 10*b* could be based on the size of user presenter 1010 and how much of a specified region within background feed 1000 user presenter 1010 occupies. For example, assume a target is set that calls for a percentage of a region (not shown) in the lower left corner of background feed 1000 to be comprised of user presenter 1010 should user presenter 1010 assume a seated position. If, as shown in FIG. 10*a*, user presenter 1010 is an adult, then once user presenter 1010 assumes a seated position it may be that user presenter 1010, as shown in FIG. 10*b*, occupies more or less than the targeted percentage of the region. In such a case, user presenter 1010, as rendered in FIG. 10*b*, may be changed in scale, or portions of user presenter 1010 may be cropped or otherwise rendered transparent before being embedded within background feed 1000. Similarly, should user presenter 1010 be a child, or otherwise diminutive adult, then user presenter, as rendered in FIG. 10*b*, may be increased in scale before being embedded. In this regard, a similar target could is set that calls for a percentage of a region (not shown) in the lower center of background feed 1000 to be comprised of user presenter 1010 should user presenter 1010 be standing. If, as shown in FIG. 10*a*, user presenter 1010 is an adult, then if user presenter 1010 assumes a standing position it may be that user presenter 1010, as shown in FIG. 10*a*, occupies more than the targeted percentage of the region. In such a case, user presenter 1010 may be changed in scale, or portions of user presenter 1010 may be cropped or otherwise rendered transparent before being embedded within background feed 1000.

Figure 11:
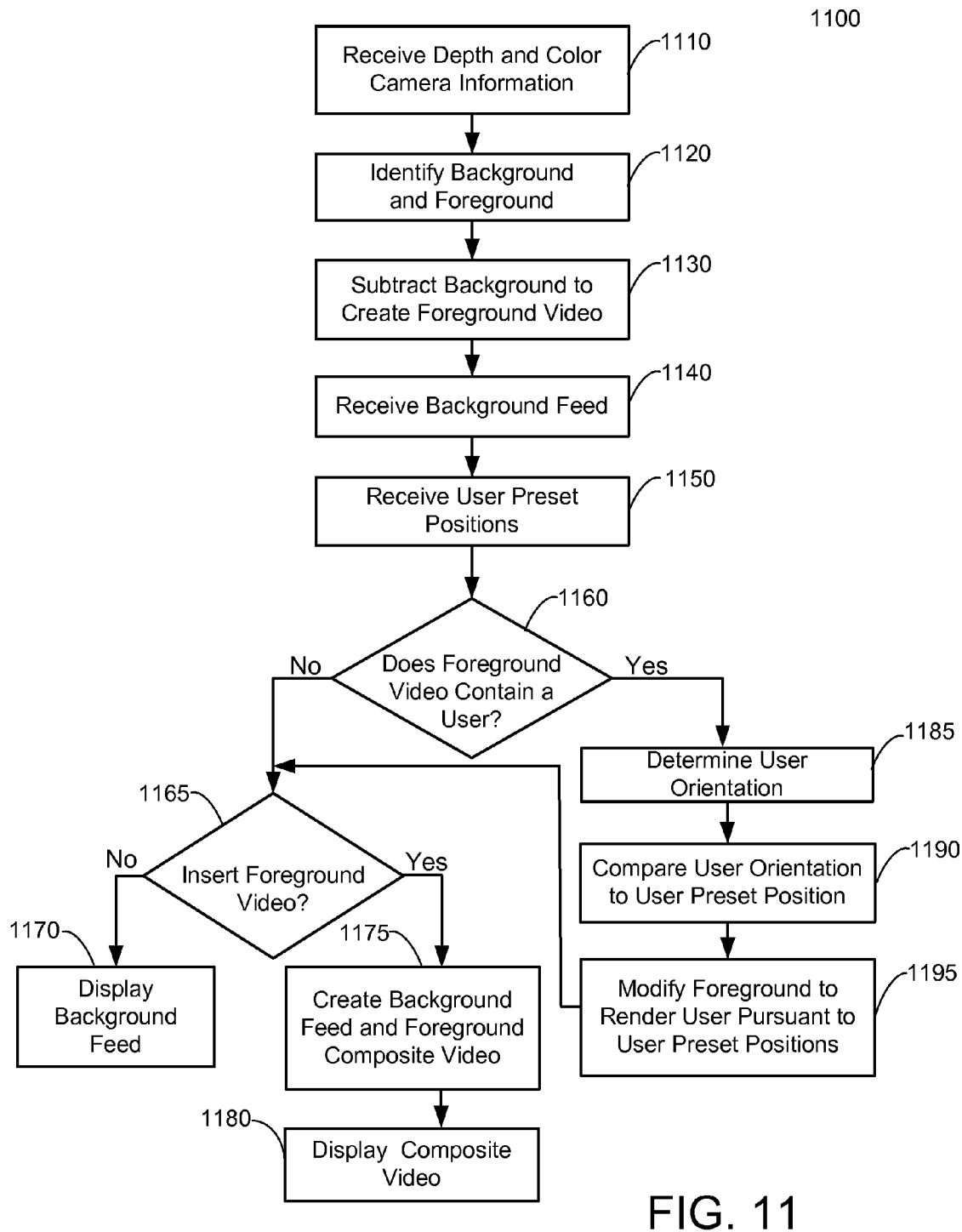
FIG. 11 is a is a flow diagram of an embodiment of a method for embedding a foreground video into a background feed depending on user configuration.

FIG. 11 is a flow diagram of a method for embedding a foreground video into a background feed according to an embodiment. At block 1110, depth and color camera information of a video is received. In some embodiments, the depth information may relate to the distance to points in an image scene from a specific point. For example, the depth information may comprise the distance of each pixel of an image frame of a video from a sensor. The color information may comprise color pixel information of an image frame of a video. The depth and color camera information may be received from a three dimensional (3D) camera, depth camera, z-camera, range camera, or from a plurality of sources. For example, the color information may be received from a color camera and the depth information may be received from a depth camera. In some embodiments, the color information and depth information may be received from a single camera. For example, the color information may be received from an red-blue-green (RGB) sensor on a camera and the depth information may be received from an infrared (IR) sensor comprised within the same camera. Generally, the method 1100 receives depth and color information of a video.

At block 1120, the background portion and the foreground portion of the video are identified. For example, given an example of a human presenter in front of a wall, the foreground portion may comprise the human presenter and the background portion may comprise the wall. Thus, at block 1120, the depth information and/or color information is used to identify the background portion and the foreground portion of a video. At block 1130, the background portion of the video is subtracted or removed to create a foreground video. For example, in the previous example of a human presenter in front of a wall, the image of the wall may be removed and the resulting video may only comprise the foreground portion (e.g., the human presenter).

At block 1140, a background feed is received. In some embodiments, the background feed may comprise an image or a slide from a presentation or a series of images or slides from a presentation. For example, the background feed may comprise a series of presentation slides which a human presenter will discuss. In the same or alternative embodiments, the background feed may comprise an image or view of a shared computer desktop, a pre-recorded video stream, live recording video stream, and/or a 3D virtual scene. Generally, the background feed may comprise any image, video, or combination of at least one image or at least one video.

At block 1150, user preset positions are received. Thus, as described with reference to FIGS. 10a and 10b, the preset position for the user, when standing, may be "centered within the background feed," though other positions within the background feed may be chosen arbitrarily. And when the user assumes a seated position the preset position may be "seated at the lower left corner of the background feed." It is also at this block that information may be received regarding other qualities of the embedded user presenter, such as scale, cropping, transparency, color level, or even video update rate. An added advantage is that such changes may reduce the apparent size or motion of the user presenter and perhaps the corresponding bandwidth requirement. And this information regarding other qualities could apply to the embedding of the standing position, or the seated position, or both. Note the potential positions that the user presenter may assume are not limited to "standing" or "seated," but rather these are illustrative of the ability of embodiments to direct the embedding of the foreground video differently based on changes in the physical configuration of the user presenter. For example, an additional such change could be the folding of arms across the chest, such that an elbow is detected.

At block 1160, it is determined whether the foreground video contains a user. In some embodiments, a motion detection of connected components is performed. This motion detection determines if a component is moving between depth image frames. A moving component may then be determined to be a person (e.g., a user). In this manner, a user may be detected at block 1160. In some embodiments, a camera may provide an infrared intensity image and the difference between the infrared intensity or depth value of the current image frame and a previous image frame may be calculated. If a pixel's infrared intensity increases by a significant amount and the pixel's value is below a specific threshold, then the pixel may be marked as moving. In embodiments where the camera does not provide an infrared intensity image, a pixel may be considered to be moving if its depth value decreases by a specific amount and the pixel depth value is below a specific threshold. Each component comprising a moving pixel may be further examined. If the number of moving pixels in a single component is above a predefined minimum amount and the percentage of moving pixels is not small relative to all pixels of the component, then the component may be tagged as being in motion and as such may comprise a user.

Continuing with block 1160, in some embodiments, a connected component in motion must have a user head detected in order for the connected component to be categorized as a user. For example, for an unknown component, user tracking may be performed and comprise checking the unknown component to determine whether the unknown component should be a foreground component or if it is a part of an existing foreground component (e.g., the unknown component is a user). If the unknown component is not part of an existing user, then the unknown component may be a new user and thus is analyzed through additional processes. Similar processes are performed for a background component.

The performance of the user tracking at block 1960 may further comprise processing checks on foreground or user components. For example, if a foreground or user component is far from a user's center of mass, then it may be re-categorized as an unknown component. If a user component is close to another user's center of mass, then it may be removed from the current user and into the second user's history. In some embodiments, the user's information may be updated based on the current frame. For example, information related to a user's center of mass, dimensions, and motion may be updated. Thus, the positioning and placement of a user may be detected such that a user's gestures and configuration may be determined. In this manner, a history of various characteristics of a user are recorded and updated. Further details concerning detecting a user can be found in published application Ser. No. 13/076,264 (filed Mar. 20, 2011, by Minh N. Do, et al.) and Ser. No. 13/083,470 (filed Apr. 8, 2011, by Quang H. Nguyen, et al.), each of which was previously incorporated herein in its entirety by reference.

If, at block 1160 it is determined that the foreground video does not contain a user, then at block 1165, it is determined whether to insert the foreground video. At block 1165, and as described with reference with FIG. 8, the foreground video may be embedded into the background feed based on a control input. For example, the foreground video may be embedded into the background feed based upon a gesture from the user presenter, a mouse click, a remote control input, an input into a smartphone application, or a keyboard stroke. If, at block 1165, it is not chosen to insert the foreground video, then at block 1170 the background feed is displayed. However, if at block 1165 it is chosen to insert the foreground video, then at block 1175 the foreground video is embedded into the background feed to create a composite video. Subsequently, in block 1180, that composite video is displayed.

Returning to block 1160, if it is determined that the foreground video does contain a user, then at block 1185 the orientation, or configuration, of the user is determined. In some embodiments, the user configuration may comprise a user's head and hands. To do so, the user's torso and neck may first be located by segmenting the user component into a plurality of horizontal slices and then moving upward until the width of the horizontal slices begins to diverge from the average width by a set amount. After finding the user's torso and neck, the user's head is identified by examining an area above the identified neck. Once the user's head is found, then the user's hands may be identified by performing a skeletonization of the user component. In some embodiments, the user's hands may be assumed to be the furthest points to the left and the right of the user's torso. The skeletonization of the user component could also include identification of the user's legs and feet, with the user's feet assumed to be the furthest points below the user's head. In such embodiments, the configuration of the user as sitting or standing could be determined based on the distance between the user's head and feet, and the subsequent changes to that dimension that are caused by sitting or standing. Given the presence of a line separating the user's feet and legs and extending toward the user's head, the user could also be assumed to be wearing trousers, or having exposed legs. The act of sitting would cause the length of that line to diminish substantially, and embodiments could employ that change to determine that the user has assumed a seated position. Conversely, the act of standing could cause that line to elongate, which would be an indication of a standing user. In an embodiment, determining the user position could be based on a combination of these indications, as well as information previously provided that concerns the history of the user movement and is used to help interpret current user configuration information. In an embodiment, the outcome of block 1190 is that a "user position" variable gets a value that signifies whether the user is standing or seated.

Once the user configuration is determined, in block 1190 that user configuration is compared to the user preset position information received in block 1150. Should the user configuration match a particular preset position, then in block 1195 the foreground video is modified to render the user pursuant to the preset position that matched the user's configuration, as described with reference to block 1150 and also FIGS. 10a and 10b. In an embodiment, should the user configuration not match a particular preset position, then the foreground video remains as it was before block 1195, i.e., it is not modified. Subsequent to block 1195, in block 1165 it is determined whether to insert the foreground video into the background feed, the outcomes of which have been described previously.

Figure 12:
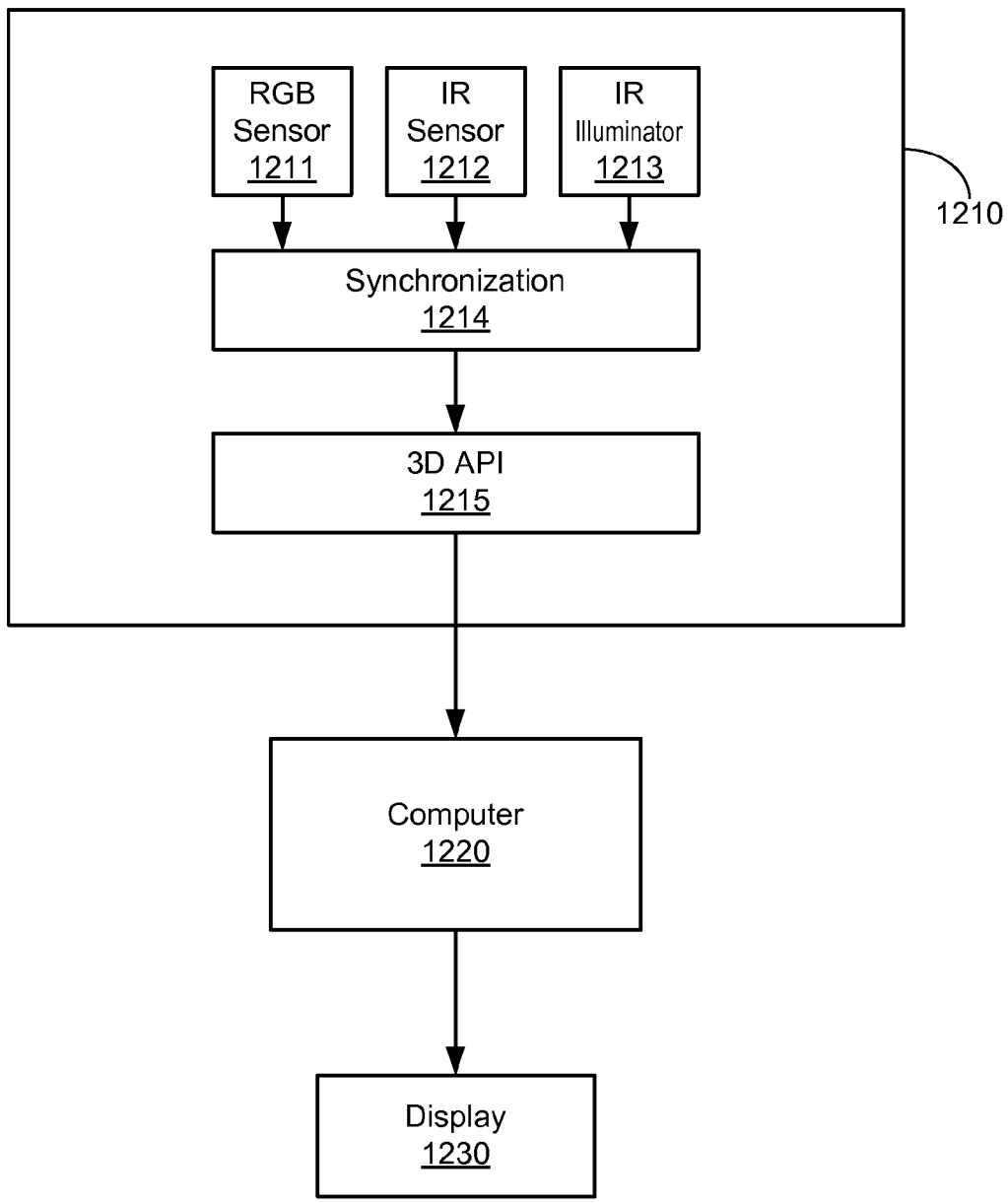
FIG. 12 illustrates an embodiment of a camera system for foreground video embedding in accordance with some embodiments.

FIG. 12 illustrates an embodiment of a camera system 1200 for the foreground video embedding systems and methods of the present embodiment. In general, the camera system 1200 comprises a camera 1210, computer 1220, and display 1230.

As seen in FIG. 12, a camera 1210 is connected to a computer 1220. The camera 1210 may comprise a three dimensional (3D) camera, depth camera, z-camera, range camera. In some embodiments, the camera 1210 may be comprised of a color or RGB camera and a depth camera or may comprise of a single camera with an RGB sensor and depth sensor. As such, the camera 1210 receives color information and depth information. The received color information may comprise information related to the color of each pixel of a video. In some embodiments, the color information is received from a Red-Green-Blue (RGB) sensor 1211. As such, the RGB sensor 1211 may capture the color pixel information in a scene of a captured video image. The camera 1210 may further comprise an infrared sensor 1212 and an infrared illuminator 1213. In some embodiments, the infrared illuminator 1213 may shine an infrared light through a lens of the camera 1210 onto a scene. As the scene is illuminated by the infrared light, the infrared light will bounce or reflect back to the camera 1210. The reflected infrared light is received by the infrared sensor 1212. The reflected light received by the infrared sensor results in depth information of the scene of the camera 1210. As such, objects within the scene or view of the camera 1210 may be illuminated by infrared light from the infrared illuminator 1213. The infrared light will reflect off of objects within the scene or view of the camera 1210 and the reflected infrared light will be directed towards the camera 1210. The infrared sensor 1212 may receive the reflected infrared light and determine a depth or distance of the objects within the scene or view of the camera 1210 based on the reflected infrared light.

In some embodiments, the camera 1210 may further comprise a synchronization module 1214 to temporally synchronize the information from the RGB sensor 1211, infrared sensor 1212, and infrared illuminator 1213. The synchronization module 1214 may be hardware and/or software embedded into the camera 1210. In some embodiments, the camera 1210 may further comprise a 3D application programming interface (API) for providing an input-output (IO) structure and interface to communicate the color and depth information to a computer system 1220. The computer system 1220 may process the received color and depth information and comprise and perform the systems and methods disclosed herein. In some embodiments, the computer system 920 may display the foreground video embedded into the background feed onto a display screen 1230.

Figure 13:
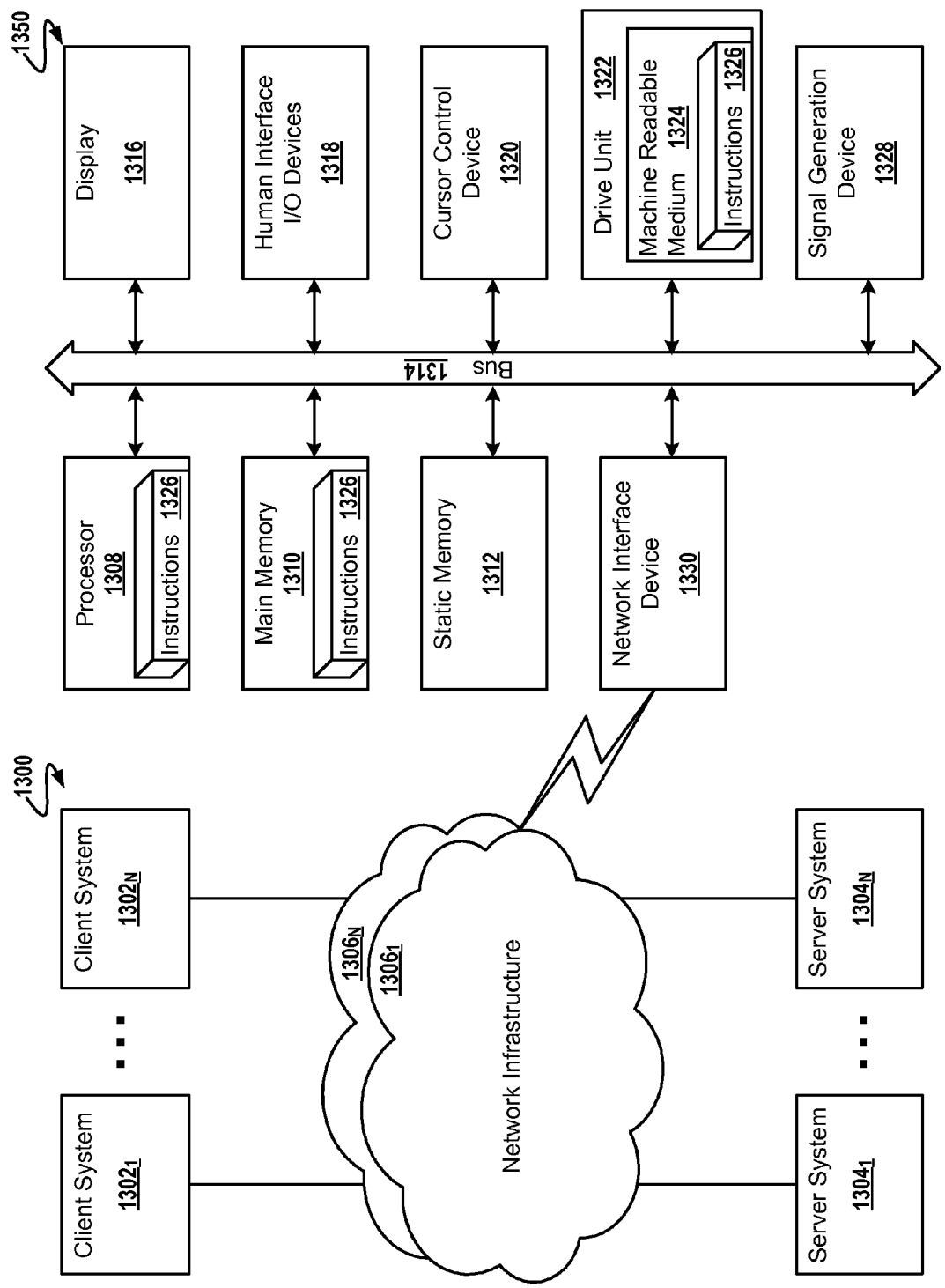
FIG. 13 illustrates an embodiment of a computer system and network system that incorporates foreground video embedding systems and methods.

FIG. 13 is a diagrammatic representation of a network 1300, including nodes for client computer systems $1302_1$ through $1302_N$, nodes for server computer systems $1304_1$ through $1304_N$, nodes for network infrastructure $1306_1$ through $1306_N$, any of which nodes may comprise a machine 1350 within which a set of instructions for causing the machine to perform any one of the techniques discussed above may be executed. The embodiment shown is purely exemplary, and might be implemented in the context of one or more of the figures herein.

Any node of the network 1300 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc.).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 1350 includes a processor 1308 (e.g. a processor core, a microprocessor, a computing device, etc.), a main memory 1310 and a static memory 1312, which communicate with each other via a bus 1314. The machine 1350 may further include a display unit 1316 that may comprise a touch-screen, or a liquid crystal display (LCD), or a light emitting diode (LED) display, or a cathode ray tube (CRT). As shown, the computer system 1350 also includes a human input/output (I/O) device 1318 (e.g. a keyboard, an alphanumeric keypad, etc.), a pointing device 1320 (e.g. a mouse, a touch screen, etc.), a drive unit 1322 (e.g. a disk drive unit, a CD/DVD drive, a tangible computer readable removable media drive, an SSD storage device, etc.), a signal generation device 1328 (e.g. a speaker, an audio output, etc.), and a network interface device 1330 (e.g. an Ethernet interface, a wired network interface, a wireless network interface, a propagated signal interface, etc.).

The drive unit 1322 includes a machine-readable medium 1324 on which is stored a set of instructions (i.e. software, firmware, middleware, etc.) 1326 embodying any one, or all, of the methodologies described above. The set of instructions 1326 is also shown to reside, completely or at least partially, within the main memory 1310 and/or within the processor 1308. The set of instructions 1326 may further be transmitted or received via the network interface device 1330 over the network bus 1314.

It is to be understood that embodiments may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

Although the present embodiment has been described in terms of specific exemplary embodiments, it will be appreciated that various modifications and alterations might be made by those skilled in the art without departing from the spirit and scope of the invention. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A computer-implemented method for controlling the embedding of a video persona into a background feed, the method comprising:
    creating a foreground video that comprises a foreground portion by removing a background portion from a first video, wherein the foreground portion comprises a persona of a user;
    receiving a background feed;
    identifying a set of user-position conditions that correspond with respective persona-embedding directions;
    determining which user-position conditions are met; and
    generating a composite video by embedding the foreground video into the background feed in accordance with the persona-embedding directions corresponding to the met user-position conditions.

2. The computer-implemented method of claim 1, wherein the set of user-position conditions comprises:
    a user movement being within a threshold distance from an initial position, corresponding to a persona-embedding direction that an embedded persona movement be similar to the user movement; and
    the user movement being beyond the threshold distance, corresponding to a persona-embedding direction that the embedded persona movement be a factor greater than the user movement.

3. The computer-implemented method of claim 2, wherein the factor is determined by a first order linear equation, a second order equation, or an exponential equation.

4. The computer-implemented method of claim 1, wherein the set of user-position conditions comprises:
    a user being within a threshold area, corresponding to a persona-embedding direction that the embedded persona is rendered transparent if the user is not within the threshold area.

5. The computer-implemented method of claim 4, wherein the set of user-position conditions comprises:
    a user being within a border adjacent to a perimeter of the threshold area, wherein the embedded persona is rendered gradually transparent depending on a user position within the border.

6. The computer-implemented method of claim 4, wherein a location of the threshold area is based on performance characteristics of a camera being used to create the first video.

7. The computer-implemented method of claim 1, wherein the set of user-position conditions comprises:
    the user assuming a standing position, corresponding to a persona-embedding direction that the embedded persona is rendered in a central position of the background feed; and
    the user assuming a seated position, corresponding to a persona-embedding direction that the embedded persona is rendered in a non-central position of the background feed.

8. The computer-implemented method of claim 1, wherein a user position is given by a center of mass of the user, the center of mass of the user being the spatial center of an image of the user's torso.

9. The computer-implemented method of claim 1, wherein the set of user-position conditions comprises:
    the user assuming a seated position, corresponding to a persona-embedding direction that the persona is rendered in a non-central position of the background feed and in either or both of (i) a diminished size and (ii) black and white.

10. The computer-implemented method of claim 1, wherein embedding the persona into the background feed is further based on at least one input from a set consisting of a gesture from the user, a mouse click, a remote control input, an input into a smartphone application, and a keyboard stroke.

11. The computer-implemented method of claim 8, wherein the center of mass of the user is used to improve embedded persona image stability within the background feed.

12. A non-transitory computer-readable medium comprising a set of instructions which, when executed by a computer, embed a video persona into a background feed, said instructions for:
    creating a foreground video by extracting that comprises a foreground portion by removing a background portion from a first video, wherein the foreground portion comprises a persona of a user;
    receiving a background feed;
    identifying a set of user-position conditions that correspond with respective persona-embedding directions;
    determining which user-position conditions are met; and
    generating a composite video by embedding the foreground video into the background feed in accordance with the persona-embedding directions corresponding to the met user-position conditions.

13. The non-transitory computer-readable medium of claim 12, wherein a user position is given by a center of mass of the user, the center of mass of the user being the spatial center of an image of the user's torso.

14. The non-transitory computer-readable medium of claim 12, wherein the set of user-position conditions comprises:
    a user movement being within a threshold distance from an initial position, corresponding to a persona-embedding direction that an embedded persona movement be similar to the user movement; and
    the user movement being beyond the threshold distance, corresponding to a persona-embedding direction that the embedded persona movement be a factor greater than the user movement.

15. The non-transitory computer-readable medium of claim 14, wherein the factor is determined by a first order linear equation, a second order equation, or an exponential equation.

16. The non-transitory computer-readable medium of claim 12, wherein the set of user-position conditions and comprises:
   a user being within a threshold area, corresponding to a persona-embedding direction that the embedded persona is rendered transparent if the user is not within the threshold area.

17. The non-transitory computer-readable medium of claim 16, wherein the set of user-position conditions comprises:
   a user being within a border adjacent to a perimeter of the threshold area, wherein the embedded persona is rendered gradually transparent depending on a user position within the border.

18. The non-transitory computer-readable medium of claim 16, wherein a location of the threshold area is based on performance characteristics of a camera being used to create the first video.

19. The non-transitory computer-readable medium of claim 12, wherein the set of user-position conditions comprises:
   the user assuming a standing position, corresponding to a persona-embedding direction that the embedded persona is rendered in a central position of the background feed; and
   the user assuming a seated position, corresponding to a persona-embedding direction that the embedded persona is rendered in a non-central position of the background feed.

20. The non-transitory computer-readable medium of claim 12, wherein the set of user-position conditions comprises:
   the user assuming a seated position, corresponding to a persona-embedding direction that the persona is rendered in a non-central position of the background feed and in either or both of a diminished size and black and white.

* * * * *